(12) United States Patent
Sagiv

(10) Patent No.: US 7,061,266 B2
(45) Date of Patent: Jun. 13, 2006

(54) METHODS AND APPARATUS FOR IMPROVING IMPEDANCE TOLERANCE OF ON-DIE TERMINATION ELEMENTS

(75) Inventor: Amir Sagiv, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 10/883,752

(22) Filed: Jul. 6, 2004

(65) Prior Publication Data

US 2006/0006902 A1  Jan. 12, 2006

(51) Int. Cl.
*H03K 19/003* (2006.01)

(52) U.S. Cl. .......................................... 326/30; 326/26

(58) Field of Classification Search ................... 326/30
See application file for complete search history.

(56) References Cited

U.S. PATENT DOCUMENTS 6,343,024 B1 *  1/2002  Zabroda ....................... 363/22
6,768,393 B1 *  7/2004  Song .......................... 333/22 R
6,963,218 B1 * 11/2005  Alexander et al. ............ 326/30

\* cited by examiner

*Primary Examiner*—James H. Cho
(74) *Attorney, Agent, or Firm*—Pearl Cohen Zedek Latzer, LLP (57) ABSTRACT

An impedance calibration circuit in an integrated circuit includes a master current source to force a master current to flow through a first load that is external to the integrated circuit. The master current source includes a stabilized current source to provide a first part of the master current and a first supplementary current source to provide a supplementary part of the master current.

30 Claims, 5 Drawing Sheets

METHODS AND APPARATUS FOR IMPROVING IMPEDANCE TOLERANCE OF ON-DIE TERMINATION ELEMENTS

BACKGROUND OF THE INVENTION

Standards for low voltage differential signaling (LVDS), such as, for example, the Institute of Electrical and Electronics Engineers (IEEE) standard 1596.3 for low voltage differential signals, and/or the American National Standards Institute/Technology Industries Association/Electronic Industries Alliance (ANSI/TIA/EIA) standard 644 for electrical characteristics of low voltage differential signaling, define tolerances for impedances of termination element for transmission lines. Termination element for transmission lines, which are implemented as parts of semiconductor dies, may have tolerances that are wider than the tolerances defined in the standards. Calibration circuits may be used to adjust impedances of such termination element.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, devices and circuits have not been described in detail so as not to obscure the embodiments of the invention.

Figure 1:
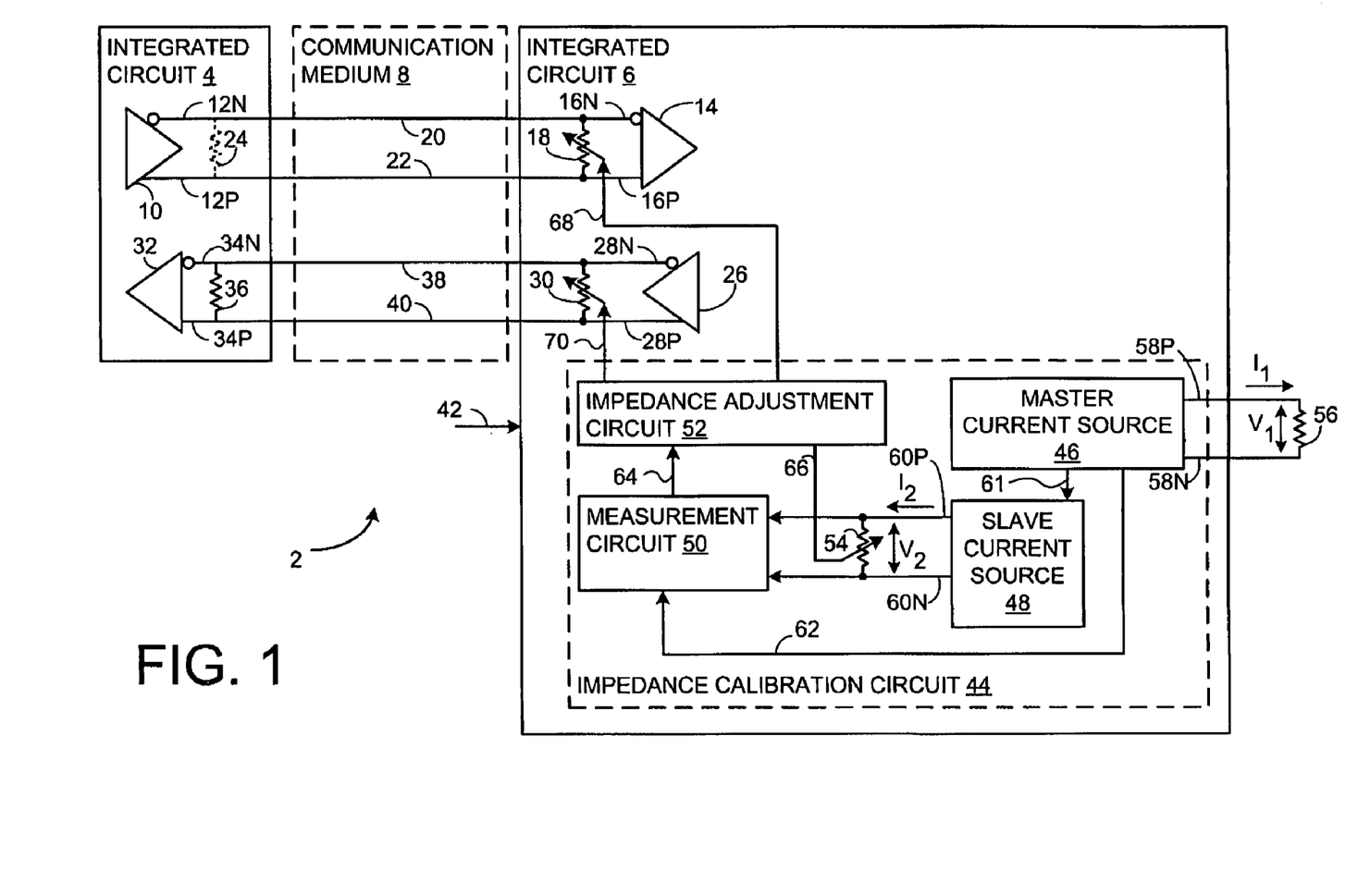
FIG. 1 is a simplified block-diagram illustration of an exemplary apparatus, in accordance with some embodiments of the invention.

FIG. 1 is a simplified block-diagram illustration of an exemplary apparatus 2, in accordance with some embodiments of the invention. Apparatus 2 may include an integrated circuit (IC) 4, an IC 6 and a communication medium 8. ICs 4 and 6 may be able to communicate with one another via communication medium 8 using a low voltage differential signaling (LVDS) protocol that may be compatible, for example, with the IEEE standard 1596.3 for low voltage differential signals (LVDS) for Scalable Coherent Interface (SCI), published in 1996, and/or with the ANSI/TIA/EIA standard 644-A for electrical characteristics of low voltage differential signaling interface circuits, published in 2001.

IC 4 may include a differential LVDS driver 10 having a positive output terminal 12P and a negative output terminal 12N. IC 6 may include a differential LVDS receiver 14 having a positive input terminal 16P and a negative input terminal 16N. In addition, IC 6 may include a termination element 18 that may be, for example, a resistor, connected between input terminals 16P and 16N of LVDS receiver 14.

Output terminal 12N may be coupled to input terminal 16N via a conductor 20 of communication medium 8, and output terminal 12P may be coupled to input terminal 16P via a conductor 22 of communication medium 8. In addition, IC 4 may optionally include a termination element 24 that may be, for example, a resistor, connected between terminals 12P and 12N of LVDS driver 10. Alternatively, optional termination element 24 may be external to IC 4.

IC 6 may include a differential LVDS driver 26 having a positive output terminal 28P and a negative output terminal 28N, and may optionally include a termination element 30, that may be, for example, a resistor, connected between output terminals 28P and 28N of LVDS driver 26. IC 4 may include a differential LVDS receiver 32 having a positive input terminal 34P and a negative input terminal 34N. In addition, IC 4 may include a termination element 36 that may be, for example, a resistor, connected between input terminals 34P and 34N of LVDS receiver 32.

Output terminal 28N may be coupled to input terminal 34N via a conductor 38 of communication medium 8, and output terminal 28P may be coupled to input terminal 34P via a conductor 40 of communication medium 8.

Communication medium 8 may be, for example, a printed circuit board (PCB), conductors 20, 22 may be, for example, a differential pair of traces, and conductors 38, 40 may be, for example, another differential pair of traces. Alternatively, communication medium 8 may be, for example, a communication cable, conductors 20, 22 may be, for example, a differential twisted pair of wires and conductors 38, 40 may be, for example, another differential twisted pair of wires.

According to IEEE standard 1596.3 and ANSI/TIA/EIA standard 644, termination elements 18, 24, 30 and 36 are required to have an impedance within a tolerance of ±10% around 100Ω (Ohm). However, due to, for example, manufacturing tolerances of IC 6, variations in voltage on power rails 42 to IC 6, and variations in operating temperature of IC 6, impedances of termination elements 18 and 30 may vary within a tolerance of, for example, ±50% around 100Ω (Ohm).

In order to ensure that the impedances of termination elements 18 and 30 comply with IEEE standard 1596.3 and ANSI/TIA/EIA standard 644, the impedances of termination elements 18, and 30 may be controllable, and IC 6 may include an impedance calibration circuit 44 to control the impedances of termination element 18 and/or termination element 30.

Impedance calibration circuit 44 may include master current source 46, a slave current source 48, a measurement circuit 50, an impedance adjustment circuit 52 and a reference load 54, that may be, for example, a resistor.

Reference load 54 and termination elements 18 and 30 may be located substantially in the same part of the semiconductor die of IC 6 and may have substantially similar attributes. For example, the impedances of reference load 54 and termination elements 18 and 30 may be substantially similar at "room temperature", e.g. +25° C. Moreover, the variation in impedances of reference load 54 and termination elements 18 and 30 may be substantially similar over the operating temperature ranges of apparatus 2 and IC6. Furthermore, the variation in impedances of reference load 54 and termination elements 18 and 30 may be substantially similar over variations in voltage on power rails 42. Furthermore, the impedance of reference load 54 may be controllable in a substantially similar way to the way the impedances of termination elements 18 and 30 are controllable. Consequently, the impedance of reference load 54 may be indicative of the impedances of termination elements 18 and 30.

Apparatus 2 may include an external load 56, that may be, for example, a resistor, that is external to IC6 and have an impedance within a tolerance of, for example, ±1% around 100Ω (Ohm) over the operational temperature range of apparatus 2. External load 56 may be connected between a positive terminal 58P and a negative terminal 58N of master current source 46. Master current source 46 may force a "master current" $I_1$ to flow from positive terminal 58P to negative terminal 58N through external load 56 and consequently, a voltage drop $V_1$ may develop on external load 56.

Current $I_1$ may be stable within a tolerance of no more than, for example, ±2% over the range of operational conditions of apparatus 2 and IC6. Consequently, voltage drop $V_1$ may be stable within a tolerance of no more than, for example, ±4% over the range of operational conditions of apparatus 2 and IC6.

Reference load 54 may be connected between a positive output terminal 60P and a negative output terminal 60N of slave current source 48. Slave current source 48 may receive one or more indications 61 from master current source 46, and may force a "slave current" $I_2$, substantially equal to master current $I_1$, to flow from positive terminal 60P to negative terminal 60N through reference load 54. Consequently, a voltage drop $V_2$ may develop on reference load 54. Indications 61 are further detailed hereinbelow in the explanations for FIGS. 2, 3 and 4.

Since the impedance of reference load 54 may not equal the impedance of external load 56, voltage drop $V_2$ may not equal voltage drop $V_1$. Measurement circuit 50 may receive voltage drop $V_2$ as an input, may receive one or more indications 62 of voltage drop $V_1$ from master current source 46, and may output one or more indications 64 of the difference between voltage drop $V_2$ and voltage drop $V_1$.

According to some embodiments of the invention, measurement circuit 50 may use comparators (not shown) to compare voltage drop $V_2$ to voltage drop $V_1$, and indications 64 may have discrete values having meanings such as, for example, "voltage drop $V_2$ is bigger than voltage drop $V_1$", "voltage drop $V_1$ is bigger than voltage drop $V_2$" and "voltage drop $V_1$ is substantially equal to voltage drop $V_2$".

According to other embodiments of the invention, measurement circuit 50 may use amplifiers (not shown) to compare voltage drop $V_2$ to voltage drop $V_1$, and indications 64 may have analog values indicating the magnitude and direction of a difference between voltage drop $V_2$ and voltage drop $V_1$.

Impedance adjustment circuit 52 may receive indications 64 and may output controls 66, 68 and 70 to adjust the impedances of reference load 54, termination element 18 and termination element 30, respectively, so to minimize or cancel the difference between voltage drop $V_2$ and voltage drop $V_1$.

Although IC 4 and IC 6 are described as being located inside apparatus 2, it may be appreciated that according to some other embodiments of the invention, IC 4 may be located in one apparatus and IC 6 may be located in another apparatus.

In the following description, the circuit formed by master current source 46, slave current source 48, reference load 54 and external load 56 is referred to as a "current mirroring circuit".

Figure 2:
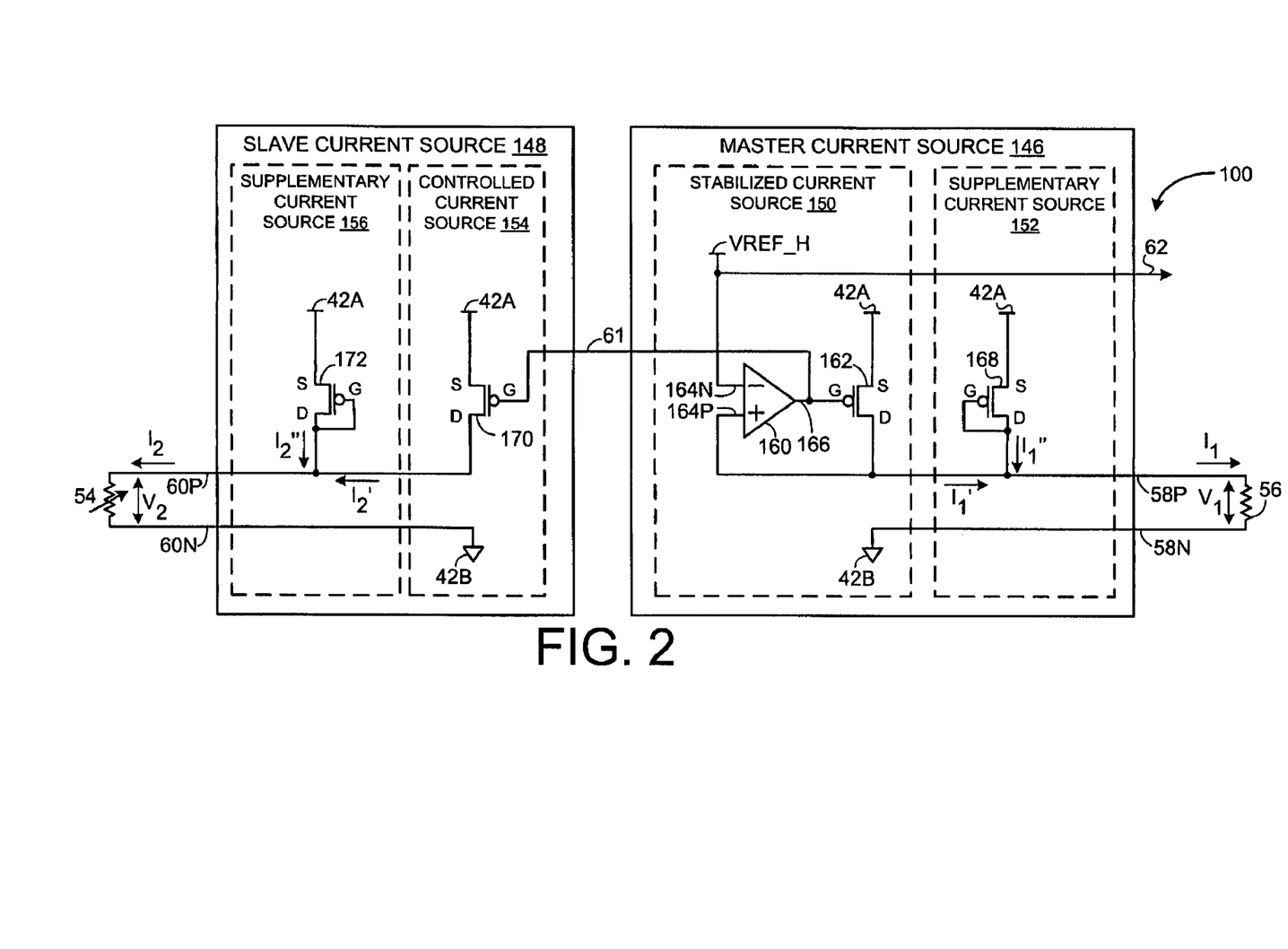
FIG. 2 is a simplified circuit diagram of an exemplary single ended current mirroring circuit, in accordance with some embodiments of the invention.

FIG. 2 is a simplified circuit diagram of an exemplary single ended current mirroring circuit 100, in accordance with some embodiments of the invention. Current mirroring circuit 100 may include a master current source 146, a slave current source 148, reference load 54 and external load 56. Master current source 146 may include a stabilized current source 150 and a supplementary current source 152. Slave current source 148 may include a controlled current source 154 and a supplementary current source 156.

Stabilized current source 150 may include an amplifier 160, and a transistor (TR) 162. A source (S) of TR 162 may be connected to a power rail 42A of, for example, 2.5V (volt). A negative input 164N of amplifier 160 may be connected to a reference voltage VREF_H of, for example, 1.4V, and a positive input 164P of amplifier 160 may be connected to a drain (D) of TR 162 and to positive terminal 58P of master current source 146. A power rail 42B of, for example, 0V, may be connected to negative terminal 58N of master current source 146. Output 166 of amplifier 160 may be connected to a gate (G) of TR 162 and as an indication 61, and reference voltage VREF_H may be connected as indication 62.

Supplementary current source 152 may include a resistive element 168 connected between power rail 42A and positive terminal 58P. According to some embodiments of the invention, as shown in FIG. 2, resistive element 168 may be a transistor, having a gate (G) and a drain (D) connected together. However, the invention is not limited in this respect, and according to some other embodiments of the invention, resistive element 168 may be another electrical element, such as, for example, a resistor.

Current $I_1$ may be a sum of a partial current $I_1'$ originating from stabilized current source 150 and a supplementary current $I_1''$ originating from supplementary current source 152. Supplementary current $I_1''$ may be limited, regardless of manufacturing tolerances of IC 6 and regardless of variations in environmental conditions, to, for example, less than half of current $I_1$.

Although the invention is not limited in this respect, supplementary current source 152 maybe switchable using a switching device (not shown), such as, for example, a transistor, connected in series to resistive element 168, in order to substantially zero current $I_1''$.

Controlled current source 154 may include a transistor (TR) 170 having its source connected to power rail 42A, its drain connected to positive output terminal 60P of slave current source 148, and its gate connected to indication 61. Negative terminal 60N of slave current source 148 may be connected to power rail 42B.

Supplementary current source 156 may include a resistive element 172 connected between power rail 42A and positive terminal 60P. According to some embodiments of the invention, as shown in FIG. 2, resistive element 172 may be a transistor, having a gate (G), a drain (D) and a source (S). However, the invention is not limited in this respect, and according to some other embodiments of the invention, resistive element 172 may be another electrical element, such as, for example, a resistor.

Current $I_2$ may a sum of a partial current $I_2'$ originating from controlled current source 154 and a supplementary current $I_2''$, originating from supplementary current source 156. Supplementary current $I_2''$ may be limited, regardless of manufacturing tolerances of IC 6 and regardless of variations in environmental conditions, to, for example, less than half of current $I_2$.

Although the invention is not limited in this respect, supplementary current source 156 maybe switchable using a switching device (not shown), such as, for example, a transistor, connected in series to resistive element 172, in order to substantially zero current $I_2''$.

Figure 3:
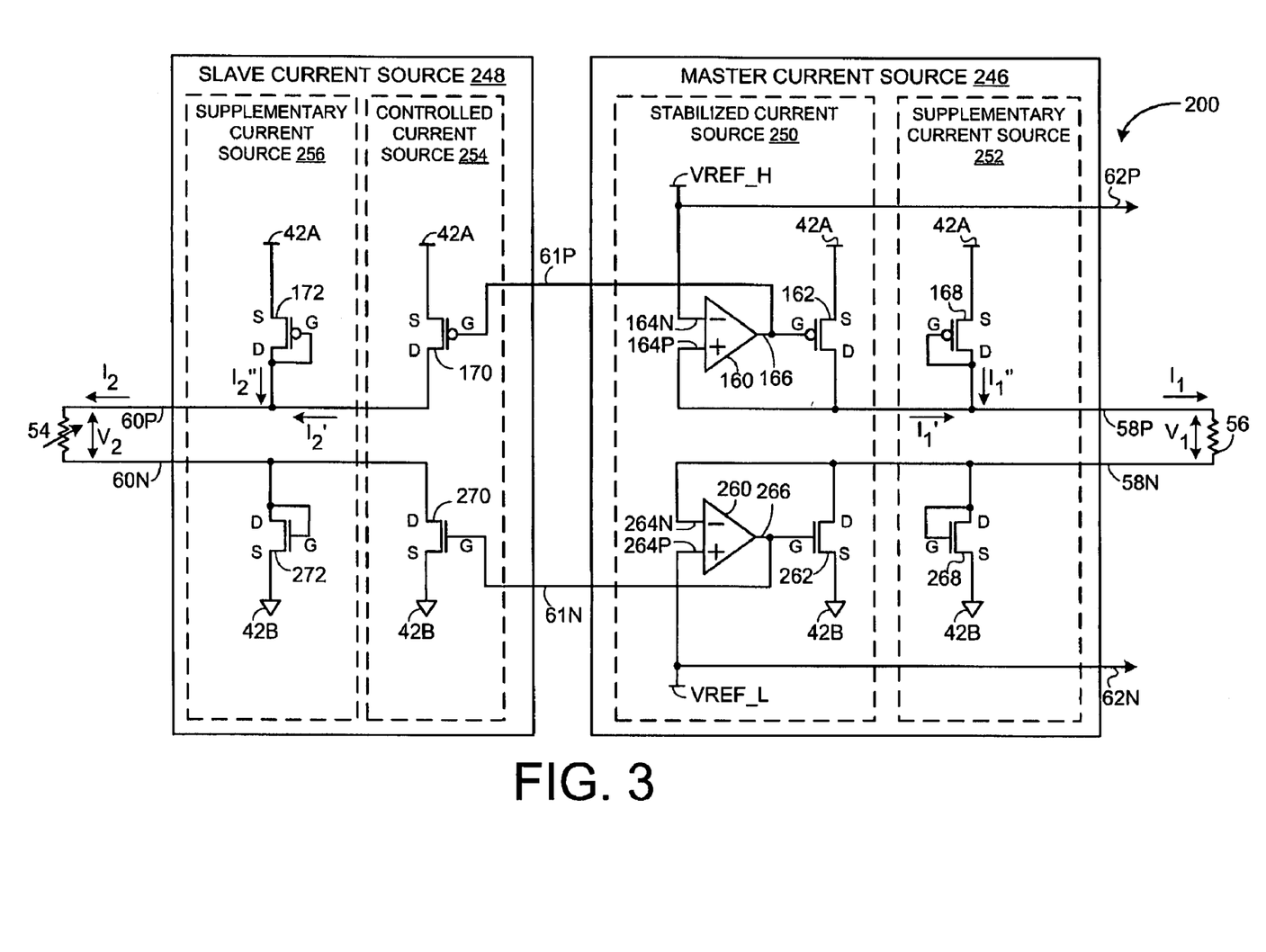
FIG. 3 is a simplified circuit diagram of an exemplary differential current mirroring circuit, in accordance with some embodiments of the invention.

FIG. 3 is a simplified circuit diagram of an exemplary differential current mirroring circuit 200, in accordance with some embodiments of the invention. Current mirroring circuit 200 may include a differential master current source 246, a differential slave current source 248, reference load 54 and external load 56. Master current source 246 may include a stabilized current source 250 and a supplementary current source 252. Slave current source 248 may include a controlled current source 254 and a supplementary current source 256.

Stabilized current source 250 may include amplifier 160, and TR 162 connected as described in FIG. 2. Two differences from the description of FIG. 2 are that indication 61 of FIG. 2 is renamed in FIG. 3 to a positive indication 61P, and indication 62 of FIG. 2 is renamed to a positive indication 62P.

In addition, stabilized current source 250 may include an amplifier 260, and a transistor (TR) 262. A source (S) of TR 262 may be connected to power rail 42B. A positive input 264P of amplifier 260 may be connected to a reference voltage VREF_L of, for example, −1.4V, and a negative input 264N of amplifier 260 may be connected to a drain (D) of TR 262 and to negative terminal 58P of master current source 246. Output 266 of amplifier 260 may be connected to a gate (G) of TR 262 and as a negative indication 61N, and reference voltage VREF_L may be connected as negative indication 62N.

Supplementary current source 252 may include resistive element 168 connected between power rail 42A and positive terminal 58P and may include a resistive element 268 connected between power rail 42B and negative terminal 58N. According to some embodiments of the invention, as shown in FIG. 3, resistive elements 168 and 268 may be transistors, having a gate (G) and a drain (D) connected together. However, the invention is not limited in this respect, and according to some other embodiments of the invention, resistive elements 168 and 268 may be other electrical elements, such as, for example, resistors.

Current $I_1$ may be a sum of a partial current $I_1'$ originating from stabilized current source 250 and a supplementary current $I_1''$, originating from supplementary current source 252. Supplementary current $I_1''$ may be limited, regardless of manufacturing tolerances of IC 6 and regardless of variations in environmental conditions, to, for example, less than half of current $I_1$.

Although the invention is not limited in this respect, supplementary current source 252 maybe switchable using a switching devices (not shown), such as, for example, transistors, connected in series to resistive element 168 and to resistive element 268, in order to substantially zero current $I_1''$.

Controlled current source 254 may include transistor (TR) 170 having its source connected to power rail 42A, its drain connected to positive output terminal 60P of slave current source 248, and its gate connected to positive indication 61. In addition, controlled current source 254 may include a transistor (TR) 270 having its source connected to power rail 42B, its drain connected to negative output terminal 60N of slave current source 248, and its gate connected to negative indication 61N.

Supplementary current source 256 may include resistive element 172 connected between power rail 42A and positive terminal 60P, and may include a resistive element 272 connected between power rail 42B and negative terminal 60N. According to some embodiments of the invention, as shown in FIG. 3, resistive elements 172 and 272 may be transistors, having a gate (G), a drain (D) and a source (S). However, the invention is not limited in this respect, and according to some other embodiments of the invention, resistive elements 172 and 272 may be other electrical elements, such as, for example, resistors.

Current $I_2$ may be a sum of a partial current $I_2'$ originating from controlled current source 254 and a supplementary current $I_2''$, originating from supplementary current source 256. Supplementary current $I_2''$ may be limited, regardless of manufacturing tolerances of IC 6 and regardless of variations in environmental conditions, to, for example, less than half of current $I_2$.

Although the invention is not limited in this respect, supplementary current source 256 maybe switchable using switching devices (not shown), such as, for example, transistors, connected in series to resistive element 172 and to resistive element 272, in order to substantially zero current $I_2''$.

Figure 4:
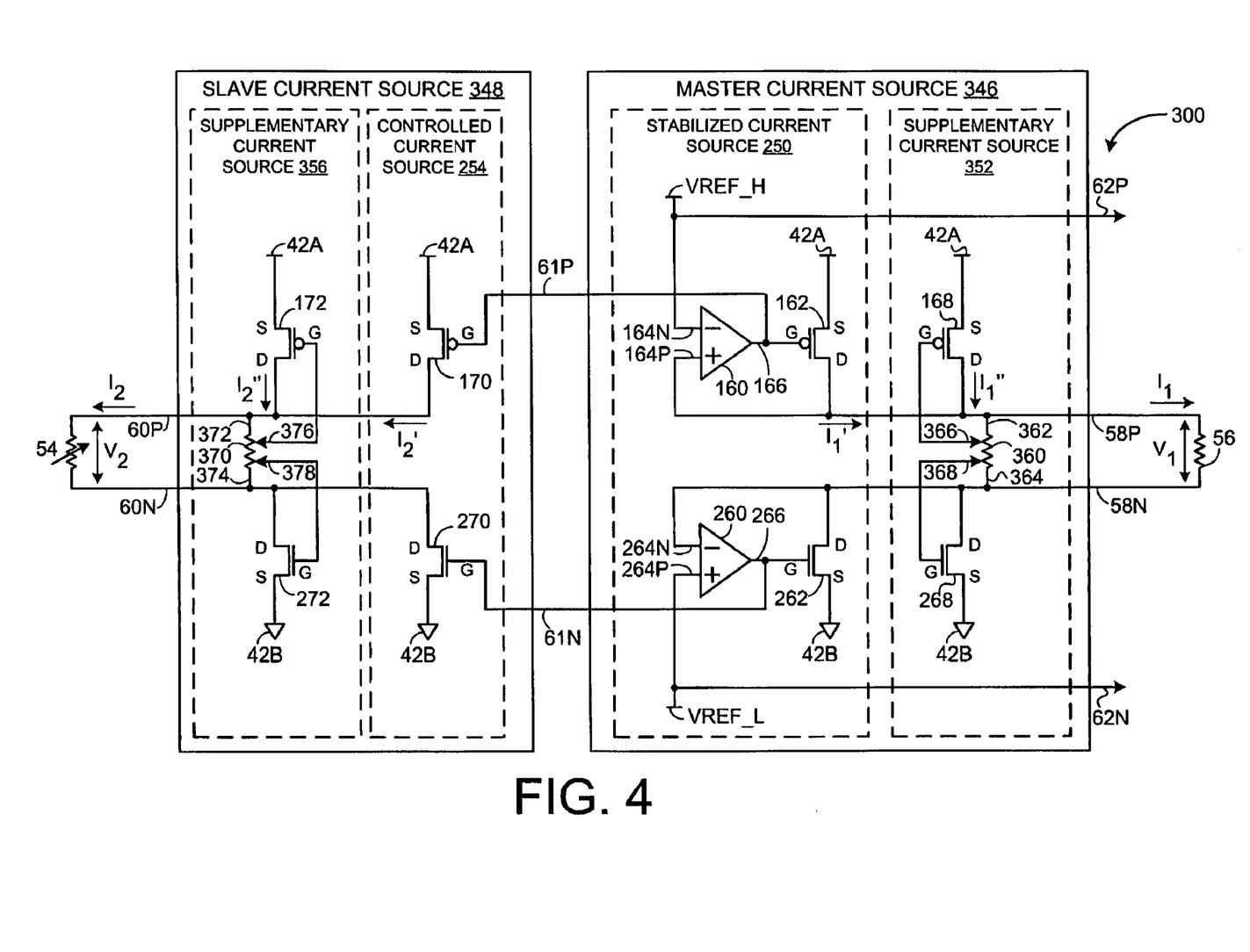
FIG. 4 is a simplified circuit diagram of another exemplary differential current mirroring circuit, in accordance with some embodiments of the invention.

FIG. 4 is a simplified circuit diagram of an exemplary differential current mirroring circuit 300, in accordance with some embodiments of the invention. Current mirroring circuit 300 may include a differential master current source 346, a differential slave current source 348, reference load 54 and external load 56. Master current source 346 may include stabilized current source 250 and a supplementary current source 352. Slave current source 348 may include controlled current source 254 and a supplementary current source 356.

Supplementary current source 352 may be identical to supplementary current source 252, except that supplementary current source 352 may include an additional voltage divider 360 having inputs 362 and 364 and having outputs 366 and 368. Input 362 may be coupled to positive output 58P and input 364 may be coupled to negative output 58N. The gate of TR 168 may be connected to output 366, and the gate of TR 268 may be connected to output 368.

Voltage divider 360 may have an impedance that is substantially higher than the impedance of external load 56. For example, voltage divider 362 may have an impedance that is at least one hundred times the impedance of external load 56.

For this reason, current $I_1$ can be considered as being substantially equal to the sum of $I_1'$ and a supplementary current $I_1''$, originating from supplementary current source 352. Supplementary current $I_1''$ may be limited, regardless of manufacturing tolerances of IC 6 and regardless of variations in environmental conditions, to, for example, less than half of current $I_1$.

Supplementary current source 356 may be identical to supplementary current source 256, except that supplementary current source 356 may include an additional voltage divider 370 having inputs 372 and 374 and having outputs 376 and 378. Input 372 may be coupled to positive output 60P and input 374 may be coupled to negative output 60N. The gate of TR 172 may be connected to output 376, and the gate of TR 272 may be connected to output 378.

Voltage divider 370 may have an impedance that is substantially higher than the impedance of reference load 54.

For example, voltage divider 370 may have an impedance that is at least one hundred times the impedance of reference load 54.

For this reason, current $I_2$ can be considered as being substantially equal to the sum of $I_2'$ and a supplementary current $I_2''$, originated from supplementary current source 356. Supplementary current $I_2''$ may be limited, regardless of manufacturing tolerances of IC 6 and regardless of variations in environmental conditions, to, for example, less than half of current $I_2$.

A non-exhaustive list of examples for apparatus 2 includes a desktop personal computer, a work station, a server computer, a laptop computer, a notebook computer, a hand-held computer, a personal digital assistant (PDA), a communication switch, a communication router, a communication server, and the like.

A non-exhaustive list of examples for integrated circuit 4 and for integrated circuit 6 includes a field programmable gate array (FPGA), an application specific integrated circuit (ASIC), an application specific standard product (ASSP), a central processing unit (CPU), a digital signal processor (DSP), a reduced instruction set computer (RISC), a complex instruction set computer (CISC), a graphics processor, a network processor, an input/output controller hub (ICH), a bridge, a north bridge, a south bridge, a LVDS crosspoint switch, a LVDS serializer/deserializer (SERDES), an universal test and operations physical interface for asynchronous transfer mode (UTOPIA) bridge, a LVDS repeater and the like.

Figure 5:
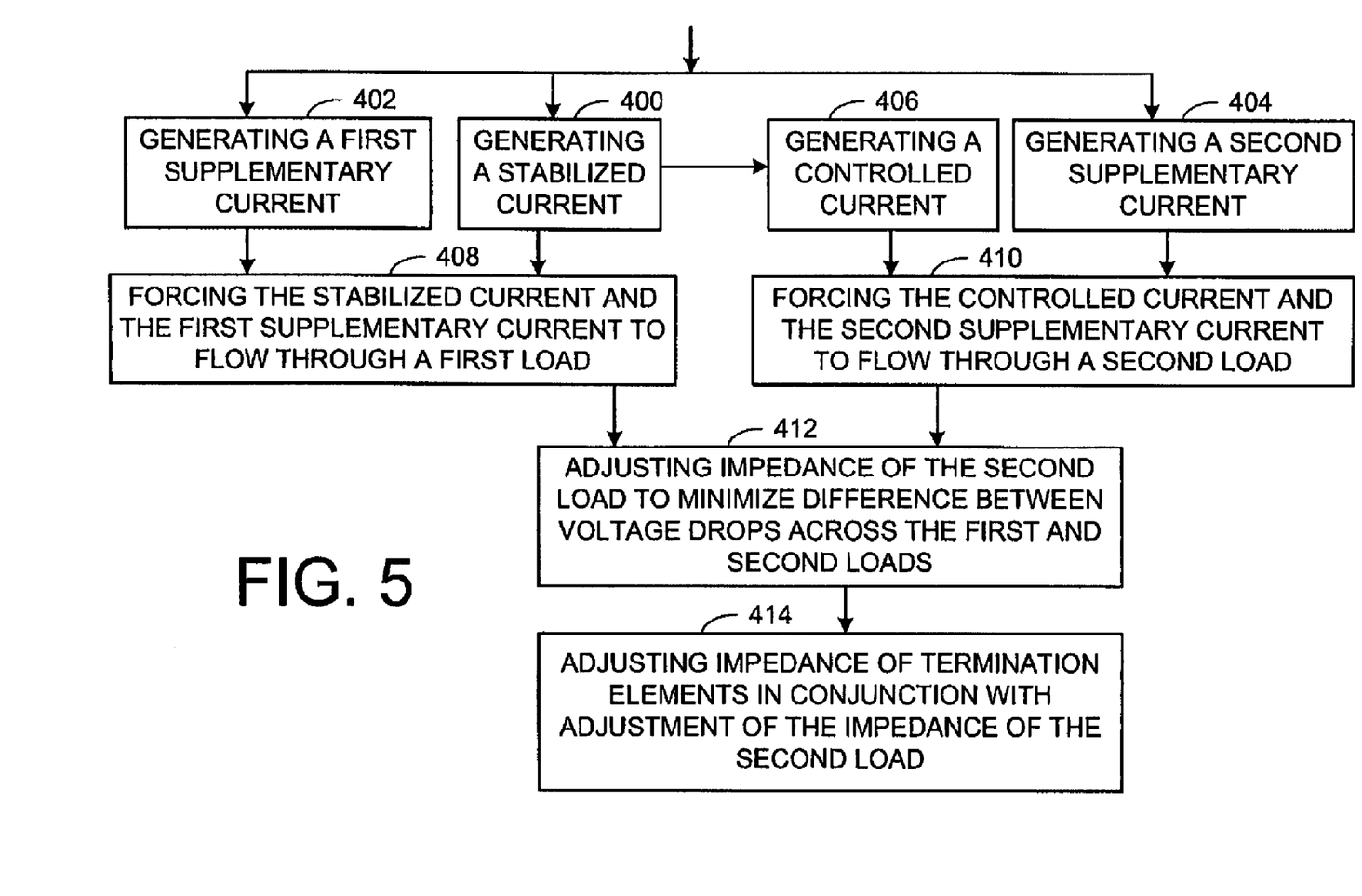
FIG. 5 is a simplified flowchart for improving impedance tolerance of on-die termination elements according to some embodiments of the invention.

FIG. 5 is a simplified flowchart for improving impedance tolerance of on-die termination elements according to some embodiments of the invention.

The method may include generating a stabilized current (400), generating a first supplementary current (402) and a second supplementary current (404) using, optionally, substantially identical circuits, and generating a controlled current related to the stabilized current (406). The first and second supplementary currents may optionally be limited, and may be optionally switchable on and off.

Once generated, the stabilized current and first supplementary current may be forced to flow through a first load (408). Similarly, once generated, the controlled current and the second supplementary current may be forced to flow through a second load (410).

The impedance of the second load may be adjusted to minimize a difference between a first voltage drop across the first load and a second voltage drop across the second load (412). Moreover, the impedance of a termination element may be adjusted in conjunction with adjusting the impedance of the second load (414). The termination element may be connected between output terminals of a low voltage differential signaling driver, or between input terminals of a low voltage differential signaling receiver.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An integrated circuit comprising an impedance calibration circuit, wherein said impedance calibration circuit comprises:
   a master current source to force a master current to flow through a first load that is external to said integrated circuit, said master current source comprising:
   a stabilized current source to provide a first part of said master current and to generate an indication of said first part of said master current; and
   a first supplementary current source to provide a supplementary part of said master current; and
   a slave current source to force a slave current to flow through a second load, said slave current source comprising:
   a controlled current source to receive said indication and to provide a first part of said slave current; and
   a second supplementary current source to provide a supplementary part of said slave current.

2. The integrated circuit of claim 1, wherein said supplementary part of said master current is limited.

3. The integrated circuit of claim 1, wherein said first supplementary current source is switchable.

4. The integrated circuit of claim 1, wherein said master current source is differential.

5. The integrated circuit of claim 1, wherein said master current source is differential and said first supplementary current source comprises one or more resistive elements to provide said supplementary part of said master current to said first load.

6. The integrated circuit of claim 5, wherein said first supplementary current source further comprises a resistive voltage divider coupled in parallel with said first load, wherein said one or more resistive elements are transistors, and wherein gates of said one or more resistive elements are coupled to said resistive voltage divider.

7. The integrated circuit of claim 1, wherein said second supplementary current source is substantially identical to said first supplementary current source.

8. The integrated circuit of claim 1, wherein said second load has a controllable impedance, and wherein said impedance calibration circuit further comprises:
   a measurement circuit to provide an indication of the difference between a first voltage drop across said first load and a second voltage drop across said second load; and
   an impedance adjustment circuit to receive said indication of the difference in voltage drop and to adjust said controllable impedance in order to minimize the difference between said first voltage drop and said second voltage drop.

9. The integrated circuit of claim 8, further comprising a low voltage differential signaling receiver and a termination element connected between a positive input terminal of said receiver and a negative input terminal of said receiver, wherein said termination element has a controllable impedance, and wherein said impedance adjustment circuit is to adjust said controllable impedance of said termination element in conjunction with adjusting said controllable impedance of said second load.

10. The integrated circuit of claim 8, further comprising a low voltage differential signaling driver and a termination element connected between a positive output terminal of said driver and a negative output terminal of said driver, wherein said termination element has a controllable impedance, and wherein said impedance adjustment circuit is to adjust said controllable impedance of said termination element in conjunction with adjusting said controllable impedance of said second load.

11. The integrated circuit of claim 1, wherein said integrated circuit is a processor.

12. An apparatus comprising:
    a communication medium;
    a first load; and an integrated circuit coupled to said communication medium and comprising an impedance calibration circuit, wherein said impedance calibration circuit comprises:
- a master current source to force a master current to flow through said first load, said master current source comprising:
  - a stabilized current source to provide a first part of said master current and to generate an indication of said first part of said master current; and
  - a first supplementary current source to provide a supplementary part of said master current; and
- a slave current source to force a slave current to flow through a second load, said slave current source comprising:
  - a controlled current source to receive said indication and to provide a first part of said slave current; and
  - a second supplementary current source to provide a supplementary part of said slave current.

13. The apparatus of claim 12, wherein said supplementary part of said master current is limited.

14. The apparatus of claim 12, wherein said first supplementary current source is switchable.

15. The apparatus of claim 12, wherein said master current source is differential.

16. The apparatus of claim 12, wherein said master current source is differential and said first supplementary current source comprises one or more resistive elements to provide said supplementary part of said master current to said first load.

17. The apparatus of claim 16, wherein said first supplementary current source further comprises a resistive voltage divider coupled in parallel with said first load, wherein said one or more resistive elements are transistors, and wherein gates of said one or more resistive elements are coupled to said resistive voltage divider.

18. The apparatus of claim 12, wherein said second supplementary current source is substantially identical to said first supplementary current source.

19. The apparatus of claim 12, wherein said second load has a controllable impedance, and wherein said impedance calibration circuit further comprises:
- a measurement circuit to provide an indication of the difference between a first voltage drop across said first load and a second voltage drop across said second load; and
- an impedance adjustment circuit to receive said indication of the difference in voltage drop and to adjust said controllable impedance in order to minimize the difference between said first voltage drop and said second voltage drop.

20. The apparatus of claim 19, further comprising a communication medium, wherein said integrated circuit further comprises:
- a low voltage differential signaling receiver and a termination element connected between a positive input terminal of said receiver and a negative input terminal of said receiver, said termination element having a controllable impedance, wherein said impedance adjustment circuit is to adjust said controllable impedance of said termination element in conjunction with adjusting first controllable impedance of said second load, and wherein said positive input terminal and said negative input terminal are coupled to said communication medium.

21. The apparatus of claim 19, further comprising a communication medium, wherein said integrated circuit further comprises:
- a low voltage differential signaling driver and a termination element connected between a positive output terminal of said driver and a negative output terminal of said driver, said termination element having a controllable impedance,
- wherein said impedance adjustment circuit is to adjust said controllable impedance of said termination element in conjunction with adjusting said controllable impedance of said second load, and wherein said positive output terminal and said negative output terminal are coupled to said communication medium.

22. The apparatus of claim 12, wherein said apparatus is a computer.

23. A method comprising:
- generating a stabilized current;
- generating a first supplementary current and a second supplementary current;
- generating a controlled current in relation with said stabilized current;
- forcing said stabilized current and said first supplementary current to flow through a first load; and
- forcing said controlled current and said second supplementary current to flow through a second load.

24. The method of claim 23, wherein generating said first supplementary current and said second supplementary current further comprises:
- generating said first supplementary current and said second supplementary current
- using substantially identical circuits.

25. The method of claim 23, wherein generating said first supplementary current and said second supplementary current further comprises:
- limiting said first supplementary current and said second supplementary current.

26. The method of claim 23, wherein generating said first supplementary current and said second supplementary current further comprises:
- switching said first supplementary current and said second supplementary current on and off.

27. The method of claim 23, wherein generating said first supplementary current and said second supplementary current further comprises:
- generating said first supplementary current and said second supplementary current using differential circuits.

28. The method of claim 23, further comprising:
- adjusting an impedance of said second load to minimize a difference between a first voltage drop across said first load and a second voltage drop across said second load.

29. The method of claim 28, further comprising:
- adjusting an impedance of a termination element in conjunction with adjusting said impedance of said second load, wherein said termination element is connected between terminals of a low voltage differential signaling driver.

30. The method of claim 28, further comprising:
- adjusting an impedance of a termination element in conjunction with adjusting said impedance of said second load, wherein said termination element is connected between terminals of a low voltage differential signaling receiver.

* * * * *